(12) United States Patent
Thakur

(10) Patent No.: US 9,253,202 B2
(45) Date of Patent: Feb. 2, 2016

(54) IT VULNERABILITY MANAGEMENT SYSTEM

(71) Applicant: Staples, Inc., Framingham, MA (US)

(72) Inventor: Satyendra Thakur, Framingham, MA (US)

(73) Assignee: Staples, Inc., Framingham (*) Notice: Subject to any disclaimer, the term of this patent is extended or adjusted under 35 U.S.C. 154(b) by 0 days.

(21) Appl. No.: 14/270,835

(22) Filed: May 6, 2014

(65) Prior Publication Data

US 2014/0331326 A1 Nov. 6, 2014

Related U.S. Application Data

(60) Provisional application No. 61/820,067, filed on May 6, 2013.

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |
| H04L 29/06 | (2006.01) | |

(52) U.S. Cl.
CPC ............. H04L 63/1433 (2013.01); H04L 63/20 (2013.01)

(58) Field of Classification Search
CPC .................................................. H04L 63/1433
USPC ........................................................... 726/25
See application file for complete search history.

(56) References Cited

U.S. PATENT DOCUMENTS

| | | | |
|---|---|---|---|
| 7,308,712 B2 | 12/2007 | Banzhof | |
| 7,680,880 B2 | 3/2010 | Landfield | |
| 8,196,207 B2 | 6/2012 | Hill et al. | |
| 8,230,497 B2 | 7/2012 | Norman et al. | |
| 8,281,396 B2 | 10/2012 | Ali-Ahmad et al. | |
| 2005/0216957 A1* | 9/2005 | Banzhof et al. | 726/25 |
| 2010/0242114 A1* | 9/2010 | Bunker et al. | 726/25 |
| 2011/0119765 A1* | 5/2011 | Hering et al. | 726/25 |
| 2012/0144494 A1 | 6/2012 | Cole et al. | |
| 2012/0185390 A1* | 7/2012 | Palnitkar et al. | 705/44 |
| 2012/0185944 A1* | 7/2012 | Abdine et al. | 726/25 |

OTHER PUBLICATIONS

I. Linkov; Multi-Criteria Decision Analysis: A Framework for Structuring Remedial Decisions At Contaminated Sites; Year:2002; IEEE; p. 15-20.*
International Search Report and Written Opinion, PCT/US2014/037022, mailed Sep. 29, 2014 (12 pages).

* cited by examiner

*Primary Examiner* — Monjour Rahim
(74) *Attorney, Agent, or Firm* — Patent Law Works LLP

(57) ABSTRACT

A system for automatically managing vulnerabilities may determine vulnerability data describing vulnerabilities in an information technology environment and then assign each vulnerability to a stakeholder for remediation. The system may receive a remediation proposal from the stakeholder, obtain approval for the remediation proposal, and facilitate remediation of the vulnerability based on the proposal.

24 Claims, 12 Drawing Sheets

IT VULNERABILITY MANAGEMENT SYSTEM

CROSS-REFERENCE TO RELATED APPLICATIONS

This application claims the benefit under 35 U.S.C. §119(e) of U.S. Provisional Application No. 61/820,067, entitled "IT Vulnerability Management System", filed on May 6, 2013, the entire contents of which is incorporated herein by reference.

BACKGROUND

IT assets, particularly key ones, are often spread over very diverse geographical locations. In such an environment, keeping the network safe from external/internal threats and meeting compliance requirements are daunting tasks, especially when critical vulnerabilities are tracked manually for remediation, which can be very time consuming.

Existing solutions for vulnerability management suffer from several risks and/or challenges. These risks include leaving vulnerabilities un-remediated for extended periods of time, sharing specific vulnerabilities with malicious entities, providing limited/inadequate user access controls, lacking monitoring of data access/download, reporting inconsistently across different business units, failing to require accountability from teams who remediate the vulnerabilities, etc. The challenges include relying on manually managed spreadsheets for reporting and tracking vulnerabilities, storing vulnerability data on an unsecured/unsupported share-point site/shared network folders, providing weak access controls around vulnerability data, releasing vulnerability reports inconsistently on a recurring basis, consistently assigning vulnerabilities to the wrong groups, relying on emails/phone calls/meetings to follow-up on and/or escalate vulnerabilities, using a tedious and difficult paper-based exception/suppression processes, using email to approve exception and/or suppression requests, failing to provide compliance audit trails, lacking integration with any ITIL (IT Infrastructure Library) processes, lacking scalability, lacking integration with a service provider's knowledgebase (used for remediation), etc.

Given the sheer size an enterprise IT environment can have, hundreds if not thousands or more vulnerabilities can be detected on a monthly basis, which further exacerbates the above-listed risks and challenges. As a result, there is a need for an automated vulnerability management and compliance system that can expedite and reliably manage vulnerability remediation.

SUMMARY

The technology described herein overcomes the above-noted deficiencies of existing solutions by providing users with efficient, flexible, powerful, and convenient automated IT vulnerabilities management and compliance systems and processes.

In one innovative aspect, an example system for automatically managing vulnerabilities may determine vulnerability data describing vulnerabilities in an information technology environment and then assign each vulnerability to a stakeholder for remediation. The system may receive a remediation proposal from the stakeholder, obtain approval for the remediation proposal, and facilitate remediation of the vulnerability based on the proposal.

In another innovative aspect, an example method may determine vulnerability data describing vulnerabilities of an information technology environment, assign each of the vulnerabilities to a stakeholder, receive a remediation proposal from the stakeholder of a first vulnerability for remediating the vulnerability, obtain an approval for the remediation proposal to remediate the first vulnerability as proposed, and facilitate remediation of the first vulnerability based on the approval.

Other embodiments of one or more of these aspects include corresponding systems, apparatus, and computer programs, configured to perform the actions of the methods, encoded on computer storage devices.

The technology is particularly advantageous in a number of respects. For instance, the technology can make compliance work more transparent through education and/or automation, create self-sufficient processes to reduce the amount of interaction with customers, auditors, and other stake-holders, assign the vulnerabilities to the correct owners, provide a single screen view of the vulnerability lifecycle, track and report remediation activities for audit/compliance purposes, automate the exception or suppression process, automate vulnerability lifecycle notifications and SLAs (service level agreements), secure vulnerability management data, reduce stress on the customers by providing transparency and clarity to the vulnerability remediation and network security compliance process, etc.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

The technology described herein may include a system configured to automatically record vulnerabilities based on vulnerability data generated by one or more network scanners, create remediation tasks based on certain severities included in the vulnerability data, assign tasks to respective teams for remediation based on certain assignment rules, provide solutions to fix or propose suppressions or exceptions for the vulnerabilities, build a workflow to manage lifecycle of the remediation tasks and the vulnerabilities, and provide reports describing IT governance, risk and compliance.

The technology described herein may, without limitation, also integrate with the service provider's knowledgebase, include built-in intelligence to automatically assign the vulnerabilities to remediation groups and/or teams, include robust approval workflow(s) for exception and suppression process, provide automated reminders to remediation groups and/or teams for vulnerability assignment/reassignment, revalidate expiring exception/suppression requests, provide automated notifications for no activity on remediation tickets, integrate with Configuration Management Database (CMDB), built-in SLAs (service level agreements) to monitor and measure a given team's remediation efforts, restrict vulnerability data on a business 'need to know' basis (e.g., using strict security rules), provide the ability to perform and track all the vulnerabilities' lifecycle steps, provide the ability to re-assign vulnerabilities to different teams, allowing end users to start the exception/suppression process, initiate a change management/service request from the remediation ticket, generate reports describing remediation activity, and allow one or more approved users to review, approve, reject, etc., exception or suppression requests, etc.

Figure 1:
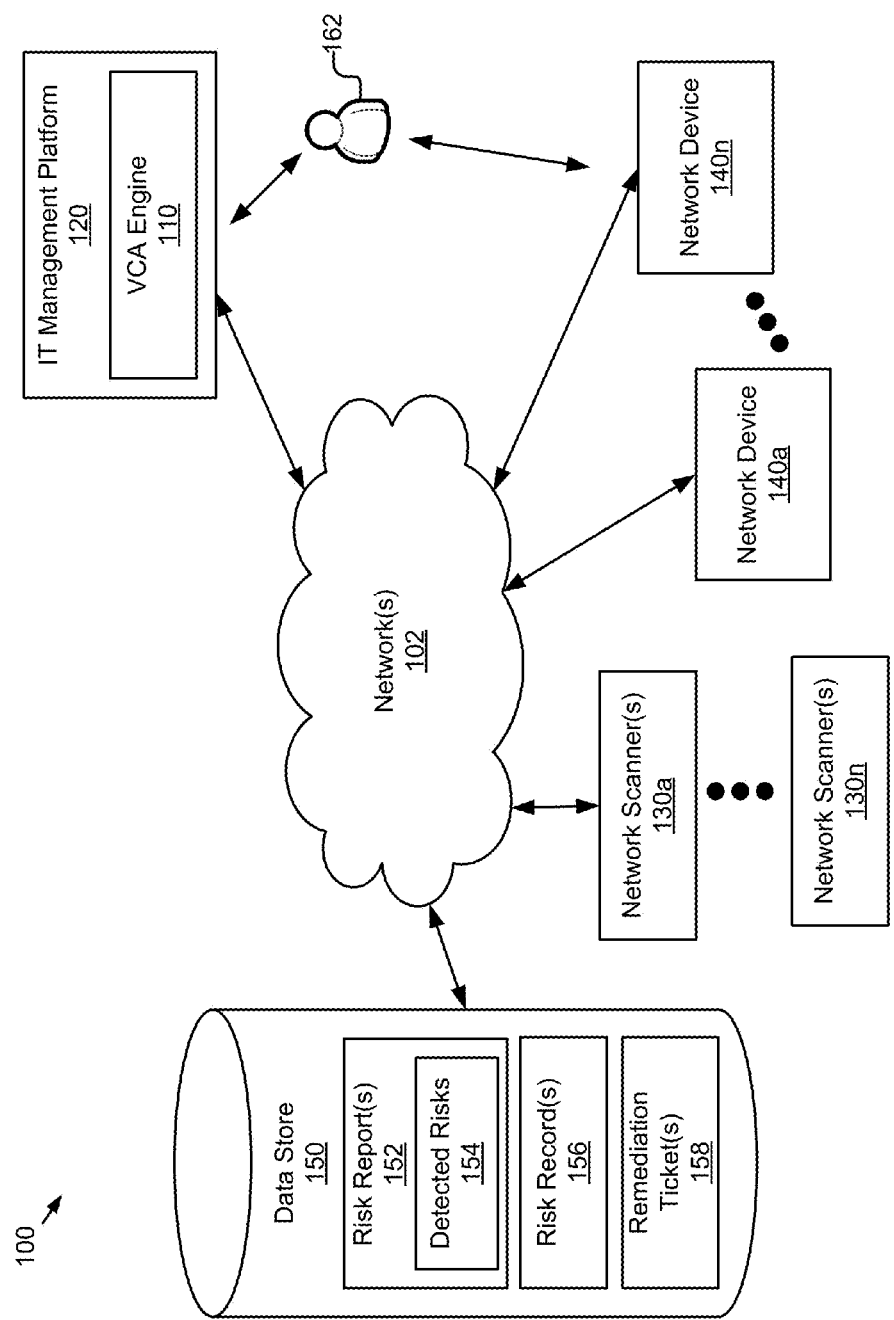
FIG. 1 depicts an example IT vulnerability management system.

The technology described herein may include various systems, methods, computer-readable media, and other devices for automatically managing IT vulnerabilities and compliance. As shown in FIG. 1, an example system 100 may include one or more network scanners 130a . . . 130n (collectively 130), an IT management platform 120, a vulnerability and compliance assessment engine (VCA engine) 110, one or more network devices 140a . . . 140n (collectively 140), and/or a data store 150. A network scanner 130 may scan the network devices 140a . . . 140n to detect risks and/or vulnerabilities (used interchangeably) and generate a risk report 152 (hereinafter "report") identifying those risks/vulnerabilities 154 and store and/or provide the report to the other entities of the system for further processing. In some embodiments, the vulnerabilities detected by the network scanner(s) 140 may be stored in a data store 150.

Vulnerabilities may include any risk, non-compliance, or other undesirable artifact within the system 100 and/or the network 102. For instance, a vulnerability may include any weakness which may allow an attacker to reduce a system's security. In another instance, the vulnerability may be a flaw in a physical or software based structure or any weakness in design, implementation, operation, or internal control. Further non-limiting examples of vulnerabilities may include one or more of backdoors, overflow vulnerabilities, software vulnerabilities (e.g., old versions, obsolete software, software bugs, etc.), viruses, trojan horses, spyware, default or weak passwords, insecure network architecture, and hardware vulnerabilities (e.g., unauthorized devices, obsolete devices, incompatible devices, malfunctioning devices, protocol weaknesses, etc.), brute force attacks, web applications vulnerabilities (e.g. buffer overflow, directory traversal, etc.), DNS and BIND vulnerabilities, database vulnerabilities (e.g., weak password, guessed name, default logins, default accounts, etc.), operating system vulnerabilities (e.g., patches, versions, etc.), e-commerce vulnerabilities (e.g., security, encryption, form manipulation, etc.), FTP vulnerabilities, firewall vulnerabilities (e.g., open ports, DNS, admin ports, etc.), remote services, etc.

The data store 150 may include any format or architecture. For instance, the data may be stored as tabular data in a DBMS, in a file system as a dataset (e.g., in Excel/XML/.CSV format), or using other known data storage techniques and formats. The data stored by the data store 150 may be organized and queried using various criteria. The data store 150 may include data tables, databases, files, structured objects, and/or other organized collections of data. The data store 150 may be included in the same storage device or system, or disparate storage systems. The DBMS could include a structured query language (SQL) DBMS, a NoSQL DMBS, various combinations thereof, etc. In some instances, the DBMS may store data in multi-dimensional tables comprised of rows and columns, and manipulate, i.e., insert, query, update and/or delete, rows of data using programmatic operations.

A network device 140 may include any type of computing device(s) including one or more of a server, virtual computer or server, workstation, computer peripheral, network apparatus, consumer device, appliance, point of sale terminal, kiosk, credit card scanner, data store, router, switch, gateways, other networking equipment, or any other device that may be connected to and/or included within a network. It should be understood that other types of devices are possible and contemplated in this disclosure. A network device 140 may operate various software (e.g., operating systems, scanners, drivers, scripts, APIs, etc.) which may be scanned by the network scanner(s) 130.

The IT management platform (hereinafter platform) 120 may be capable of executing various ITIL processes including, without limitation, change management, incident/problem, CMDB/asset management, IT/HR helpdesk, governance, risk and compliance (GRC) platform, etc. In some embodiments, the platform 120 is implemented as a platform and/or software service (PaaS, SaaS, etc.) configured to interact with the one or more scanners 130. In some embodiments, the VCA engine 110 may be built on top of the platform and utilizes the APIs exposed by the platform to perform its functionality, although other variations are possible such using a separate software and/or hardware architecture for the VCA engine 110 that is configured to interact with the platform via standard networking and data access protocols. Users 162, such as stakeholders (including vulnerability specialists) may access the services, acts, and/or functionality provided by the VCA engine 110 directly and/or via the platform 120.

The scanner(s) 130 may routinely (e.g., monthly, weekly, daily, hourly, in real-time, etc.) scan the network(s) 102 and network device(s) 140 for risks, generate a report 152 detailing the risks, and provide the report to the VCA engine 110 (e.g., via a data store or directly) for further processing. Risks of all severity levels and types may be monitored and reported by the scanner(s).

The scanner(s) 130 may include hardware and/or software and may scan the network/network devices for vulnerabilities that have been loaded into a vulnerability information database. The database may be stored in the data store 150 or may be stored in a different location. The vulnerability data may be loaded into the database manually (e.g. by a stakeholder) and may include potential vulnerabilities, data about the vulnerabilities, and suggested steps to fix the vulnerabilities. In some embodiments, the vulnerabilities may be uploaded automatically from one or more sources having vulnerability data. For example, a third party may accumulate lists of vulnerabilities about a particular browser as well as information about how to fix these vulnerabilities then the VCA engine 110 may be responsible for automatically uploading the information about these vulnerabilities and formatting them so they can be used by the system 100.

To keep the network 102 secure and to comply with compliance/governance SLAs, the risks may require some form of remediation. Based on information from the risk report, the VCA engine 110 may automatically create risk records 156 and associated remediation ticket(s) 158 (hereinafter ticket), which may include one or more tasks. The risk records 156 may differ depending on the type of device-related information given in the report 152, including, without limitation, unique IDs, device addresses, IP addresses, port numbers, etc. The associated tickets may be indexed using one or more unique identifiers. The identifiers may be based on the device-related information from the risk record. For instance, the identifiers may include an IP address, a port number, a unique vulnerability ID, etc.

Remediation options may include suppression of vulnerabilities, exception/exemption (used interchangeably) of vulnerabilities, and/or fixing of vulnerabilities. Suppression refers to action taken when a scan has resulted in a false positive (e.g. the network scanner has incorrectly indicated that a particular vulnerability is present). Exception refers to an election by a stakeholder to not fix a vulnerability at the present time or for some duration. Fixing of vulnerabilities may include any number of steps or tasks and may require only moments or may require many hours over multiple months to complete. Fixing of vulnerabilities may be an automated process, manual process, or a combination of the forgoing.

In some embodiments, the VCA engine 110 may merge newly identified vulnerabilities with existing vulnerabilities based on the device-related information. In cases where the VCA engine 110 is unable to match up some or all of the device-related information between original and newly received vulnerability data (e.g., port number is different from the original data or a port number for a given risk is blank), a new risk record and/or remediation ticket may be created. The VCA engine 110 may populate the risk record and/or ticket based on information included in the report(s) received from the network scanner(s) 130.

In some embodiments, a ticket 158 may be automatically created/opened and/or assigned by the VCA engine 110 based on vulnerability data and/or business rules. In some embodiments, a remediation ticket 158 may be created by the VCA engine 110 based on a vulnerability 154 identified in a report 152. For example, a risk record 156 may be automatically created based on risks included in a report 152 received from the network scanner 130 and then an associated remediation ticket 158 may be automatically generated and populated based on information from the risk report 152 and/or the system 100, such as a risk number, a configuration item, an assignment group, source of risk, state of risk, description about the risk, etc. (e.g., see FIG. 7). A risk record 156 may be automatically updated based on the progress made in a remediation task. The VCA engine 110 may create remediation tickets 158 for new risks and, for existing/recurring risks, may update any corresponding tickets 158 that may already exist, etc.

The VCA engine 110 may be coupled to a data store 150 and/or the scanner(s) 130 to receive/download the reports. In some embodiments, the VCA engine 110 includes a cron job or similar timer-based mechanism that is scheduled to execute at various regular intervals to retrieve, for further processing, the reports stored by the scanner(s) in a shared location, such as a file system folder, database, or other data store/information source.

The VCA engine 110 and/or scanner(s) 130 may rate the severity of the risks included in the report using previously determined risk information (e.g., aggregated from other information sources such as a virus and/or threats database). These ratings may be used to determine whether to automatically open records and/or tickets for those risks. For instance, if the severity level (e.g., SEV 3, 4, 5, etc.) meets a predetermined threshold (e.g., 3), the VCA engine 110 may automatically create a risk record and/or ticket.

A knowledgebase associated with the network scanner(s) 130 may be loaded by the system to allow remediation teams to look up solutions for the vulnerabilities. Any ticket that is generated by the VCA engine 110 based on this knowledgebase may have associated vulnerability related information (e.g., unique ID) attached to it. This beneficially allows the operational teams to have direct access to existing solutions included in the knowledgebase, thus eliminating the need to refer to any outside resources (e.g., log into an external website for network scanner(s)).

The VCA engine 110 is capable of defining policy and control definitions and performing audits within the system in order to meet compliance requirements. In some embodiments, various policy and control definitions (also known as vulnerability management controls) may be defined by a vulnerability specialist via the system (e.g., the platform). Using the system, the vulnerability specialist may map the vulnerability management compliance controls to the compliance requirements/standards (e.g. SOX, PCI DSS, HIPPA, Privacy, ITIL, ISO etc.). This beneficially allows vulnerability management personnel (e.g., a group/team/stakeholder) to adhere to compliance requirements and make adjustments as needed. Using the system, a vulnerability admin may edit the policy and control definitions, or may make any necessary adjustments, as needed. The system may provide functionality for initiating an audit and assigning controls to respective owners. A vulnerability administrator can use the system to define various test scenarios that need to be executed and an owner of the control can use the system to document his/her observations when carrying out the test scenarios.

A vulnerability specialist may define vulnerability management controls (e.g., which may be required by PCI Compliance requirements) using the system. For example, the system may provide an interface that enables the specialist to create and edit the controls, and link the controls to corresponding control tests that are required to be carried out for auditing purposes. A control test definition may allow the assignment groups (e.g., new employees) to more quickly and fully understand any compliance requirements. In some embodiments, a vulnerability specialist may use the system to define a process that stores any unknown IP addresses (e.g., in a compliance database) and flags them so they can manually be added. The vulnerability specialist may specify a qualifier for IP addresses to segregate between internal and external IP addresses.

Regarding the exception or suppression processes, the VCA engine 110 may allow operational teams (i.e., teams and/or groups responsible for remediation of a risk/vulnerability) to create an online suppression or exception request to address a given vulnerability. The team may start the exception or suppression method (i.e., request for suppression/exception) from a remediation ticket, risk record, etc., using the system. For instance, from the remediation ticket (e.g., see FIG. 7), a stakeholder may change the state to "suppression" or "exception." This can open the suppression or exception-related fields on a remediation form (e.g., see FIG. 10). Once these fields are completed, the VCA engine 110 may send the form to the appropriate group for review (e.g., approval). The exception or suppression processes may require approval from a single group or different groups (see or refer to FIG. 6 for details). The VCA engine 110 tracks these approvals to reduce the potential for bottlenecks in the process.

In some embodiments, an operational team may add additional IP addresses to existing suppression and exception requests using the system, for example, when adding or removing servers. This allows any new hardware to be tied back to existing requests. If at any point a suppression request is rejected during the suppression processes, the VCA engine 110 may proceed to an investigating state and preserve the ticket as active (see FIG. 5). If an exception or suppression request is approved, then the VCA engine 110 may receive comments for the request and add the comments to the remediation form. Exception and suppression requests that are approved may be loaded into the platform by the VCA engine 110 for further processing. Once a risk has been suppressed/exempted, the VCA engine 110 may update a flag in the risk database (i.e., risk/vulnerability data received from network scanner(s)) to prevent any updates for that risk ID being received during the validity period. Using the system, a vulnerability specialist may validate the existing suppression and/or exception requests on a regular basis.

The VCA engine 110 may generate reports on remediation progress by area to help ensure adherence to compliance policy. For example, area-specific reports may be generated to cover a team, director, ITIL, CI class, manager, assignment group, etc. These reports may provide data points showing any outstanding action items (e.g., unresolved tickets, non-compliant remediation efforts, requests that are pending approval by an appropriate group, etc.). The VCA engine 110 may provide these reports for review by a specialist team or another stakeholder on a periodic basis.

A vulnerability specialist may use the system to setup automated reminders and to automatically escalate records, tickets, etc., when compliance policies requirements are not being met. For example, once the exception method starts, people responsible for reviewing/approving the exception may be notified by the system via email and sent a reminder email by the system if no action has been taken within the stipulated time. The system may also notify vulnerability management administrators and remediation groups/teams when an exception or suppression request has been approved or rejected.

In some embodiments, a vulnerability specialist may create a risk record 156 and/or ticket 158 by loading/inputting the risk record and/or ticket into the system 100 for processing (e.g., tracking, monitoring, and facilitating their remediation). The risk record 156 and/or ticket 158 may be based on an existing risk record 156, a risk report 152, or other risk-related information. By way of example, the specialist may manually create a risk record 156 and/or ticket 158 based on a risk included in a report 152. In some instances the risk may have an unknown or undetermined severity, or may be related to sensitive consumer or organization data (e.g., is PCI (payment card industry)-related). In another example, a specialist may input risk-related information for a previously unknown or unrecognized risk (e.g., not included in a report 152) so the risk can be remediated. In some embodiments, a vulnerability specialist may update a ticket 158 as the risk and/or its remediation evolves. For instance, a specialist may update a status field of ticket 158 with progress indicators and/or action items to help drive workflow.

The tasks in a given remediation ticket 158 may be assigned by the VCA engine 110 to the appropriate stakeholders and/or teams of stakeholders for remediation. The assignments may be automatically determined by the VCA engine 110 based upon one or more assignment rules. In some embodiments, the VCA engine 110 may be configured to route a risk to an appropriate group based on the 1-to-1 mapping between a unique identifier and an operating environment (operating system (OS)) associated with the risk. In some embodiments, the VCA engine 110 may route risks (e.g., tickets 158) to a vulnerability admin group which may manually and/or provide input to automatically route the tickets 158 to the appropriate support groups (via a corresponding user interface provided by the system 100). In some instances, the vulnerability admin group and/or support groups may reference policies and manually control/override the risk records 156 and/or the routing of the tickets 158.

The VCA engine 110 may support real-time updates to the risk records 156 and/or tickets 158. An activity log may be maintained by the VCA engine 110 that keeps track of any updates made to a record 156 and/or ticket 158. The VCA engine 110 may automatically update a given risk record 156 or ticket 158 based on any developments (e.g., progress being made or lack thereof). In some embodiments, the VCA engine 110 may execute an exception and/or suppression process to mitigate each risk, which is discussed in further detail below with respect to FIGS. 3 through 6, for example.

In some embodiments, the system 100 may further include specific modules for international locations. Such specific modules may allow the system to address vulnerabilities on an international level or to segment a risk report 152, risk records 156, and remediation tickets 158 to specific countries. Vulnerabilities may be segmented based on international boundaries or based on geographic boundaries where different policies or actions are required.

In some embodiments, a vulnerability specialist may manage and maintain separate security groups to restrict access to vulnerability management related information. The vulnerability data may, in certain cases, be company-classified data. The system may limit access to this data strictly on need to know basis. Security rules may be defined using the system for two or more roles including the vulnerability administrator and users in assignment group. The ability to edit various aspects of the data may be segmented by the system depending on the user. For instance, approvers may have the ability to write to the remediation records to which they are assigned but may have read-only access for other information associated with the record. A manager or team lead may be restricted by the system and may not see data for other teams (e.g., a Linux team may be restricted from viewing the records assigned to a Windows team). However, the system may provide this individual with the ability to reassign various records and/or tickets (and the vulnerability management process associated with them) to different teams. The system may provide administrators the ability to see and update any data accessible via the platform. For example, a vulnerability administrator may add/update/delete data from vulnerability tickets and add comment/take action on any tickets as a part of their day-to-day activities.

Figure 2:
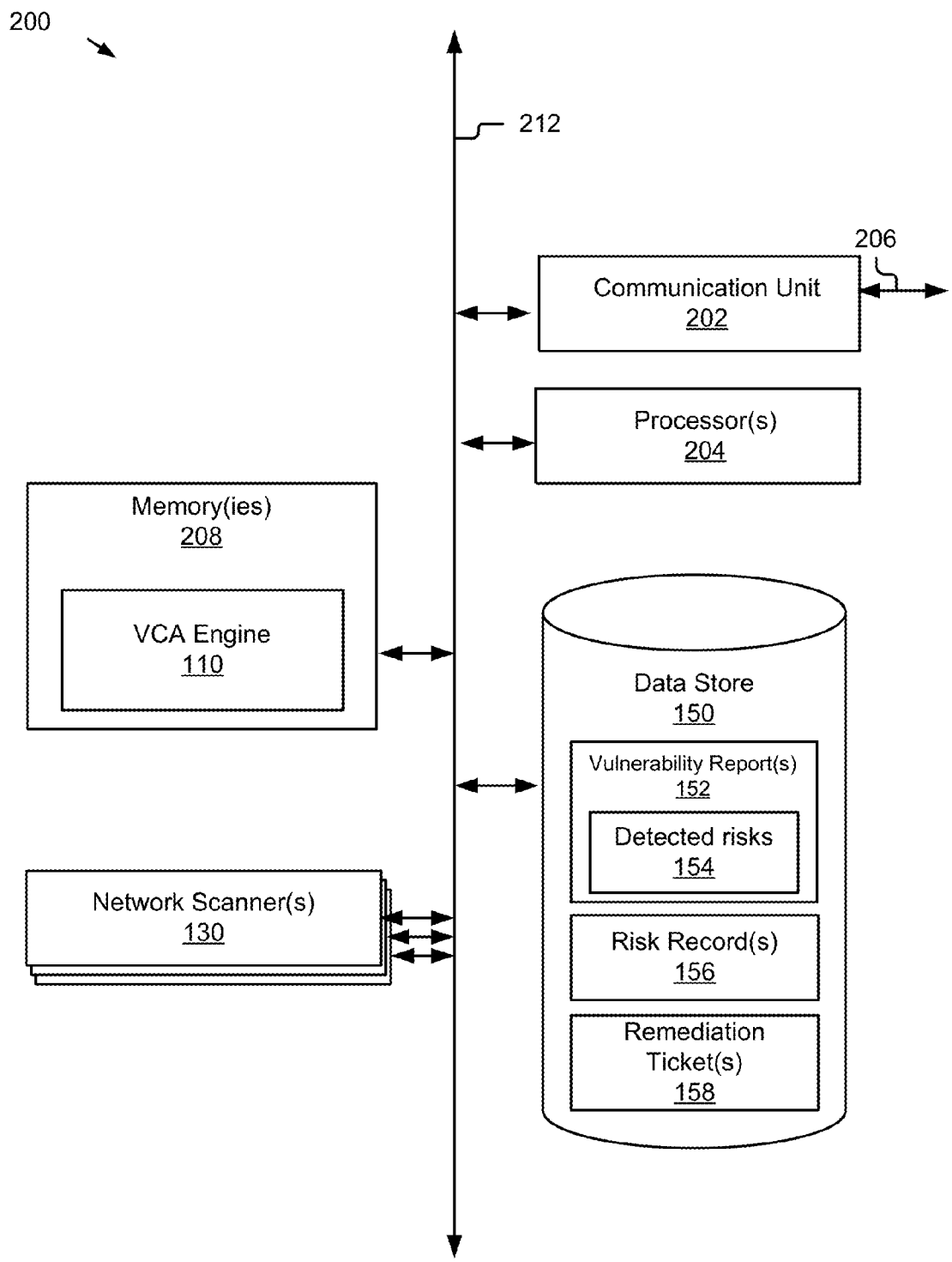
FIG. 2 is a block diagram depicting an example computing system for automatically managing vulnerabilities.

FIG. 2 is a block diagram depicting an example computing system 200 for managing IT vulnerabilities. The system 200 may include one or more of processor(s) 204, memory(ies) 208, communication unit(s) 202, network scanner 130, and data store(s) 150, which may be communicatively coupled by a communication bus 212. The system 200 depicted in FIG. 2 is provided by way of example and it should be understood that it may take other forms and include additional or fewer components without departing from the scope of the present disclosure. For example, while not shown, the system may include input and output devices (e.g., keyboard, display, etc.), various operating systems, sensors, additional processors, and other physical configurations. The system 200 may be a local or distributed computing system.

The processor(s) 204 may execute software instructions by performing various input/output, logical, and/or mathematical operations. The processor(s) 204 may have various computing architectures to process data signals including, for example, a complex instruction set computer (CISC) architecture, a reduced instruction set computer (RISC) architecture, and/or an architecture implementing a combination of instruction sets. The processor(s) 204 may be physical and/or virtual, and may include a single core or plurality of processing units and/or cores. In some embodiments, the processor(s) 204 may be capable of generating and providing electronic display signals to a display device (not shown), supporting the display of images, capturing, and transmitting images, performing complex tasks including various types of feature extraction and sampling, etc. In some embodiments, the processor(s) 204 may be coupled to the memory(ies) 208 via the bus 212 to access data and instructions therefrom and store data therein. The bus 212 may couple the processor(s) 204 to the other components of the system 200 including, for example, the memory(ies) 208, the communication unit 202, and the data store 150.

The memory(ies) 208 may store and provide access to data to other components of the system 200. In some embodiments, the memory(ies) 208 may store instructions and/or data that may be executed by the processor(s) 204. For example, as depicted, the memory(ies) 208 may store the VCA engine 110 and its components. In some embodiments the memory(ies) 208 may include the network scanner(s) 130 or portions thereof, the IT management platform 120 or portions thereof, and/or any other modules. The memory(ies) 208 are also capable of storing other instructions and data, including, for example, an operating system, hardware drivers, other software applications, databases, etc. The memory(ies) may be coupled to the bus 212 for communication with the processor(s) and the other components of the system 200.

The memory(ies) may be coupled to the bus 212 for communication with the processor(s) 204 and the other components of the system 200. The memory(ies) 208 include a non-transitory computer-usable (e.g. readable, writeable, etc.) medium, which can be any tangible non-transitory apparatus or device that can contain, store, communicate, propagate or transport instructions, data, computer programs, software, code, routines, etc., for processing by or in connection with the processor(s) 204. In some embodiments, the memory(ies) 208 may include one or more of volatile memory and non-volatile memory. For example, the memory(ies) 208 may include, but are not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 208 may include a single device or may include multiple types of devices and configurations.

The bus 212 can include a communication bus for transferring data between components of a computing device or between computing devices, a network bus system including the network 102 or portions thereof, a processor mesh, a combination thereof, etc. The software communication mechanism can include and/or facilitate, for example, interprocess communication, local function or procedure calls, remote procedure calls, etc.

The communication unit 202 may include one or more interface devices (I/F) for wired and/or wireless connectivity with the network 102 and the other components of the system 100, for example the network devices 140, etc. For instance, the communication unit 202 may include, but is not limited to, CAT-type interfaces; wireless transceivers for sending and receiving signals using Wi-Fi™; Bluetooth®, cellular communications, etc.; USB interfaces; various combinations thereof; etc. The communication unit 202 may be coupled to the other components of the system 200 via the bus 212. The communication unit 202 may be coupled to the network 102 as illustrated by the signal line 206 or directly to any other component of the system 100 by the signal line 206. In some embodiments, the communication unit 202 can link the processor(s) 204 to the network 102, which may in turn be coupled to other processing systems. The communication unit 202 can provide other connections to the network 102 and to other entities of the system 100 using various standard communication protocols, including, for example, those discussed elsewhere herein.

The network scanners 130 include hardware and/or software for scanning any network devices 140 and/or software operable on those devices. A non-limiting example network scanner 130 may include QualysGuard® software operable on a computing device, such as a QualysGuard® Scanner Appliance, although it is not limited to such and may include any software and/or hardware capable of detecting vulnerabilities on all network assets.

In some embodiments, one or more of the components 110, 120, and 130 include sets of instructions executable by the processor(s) 204. In some embodiments, one or more of the components 110, 120, and 130 include instructions that are stored in the memory(ies) 208 of the system 200 and are accessible and executable by the processor(s) 204. In any of the foregoing embodiments, one or more aspects of these components 110, 120, and 130 may be adapted for cooperation and communication with the processor(s) 204 and other components of the system 100.

Figure 3:
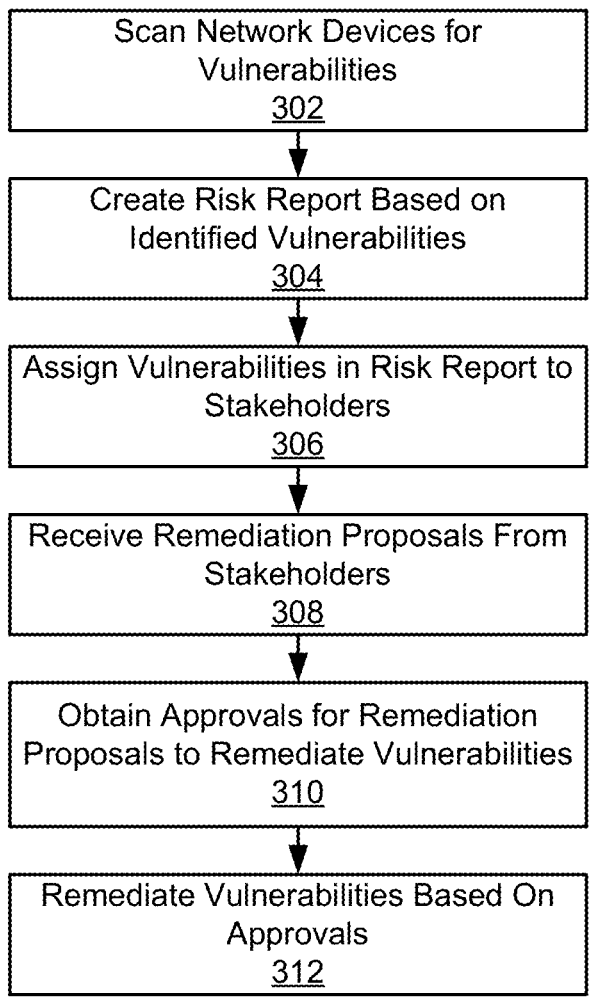
FIG. 3 depicts an example method for automatically managing vulnerabilities.

FIG. 3 depicts an example method 300 for automatically managing vulnerabilities. The method 300 may begin by determining vulnerability data describing vulnerabilities of an information technology environment. In some embodiments, the network scanner(s) 130 may determine the vulnerability data by scanning network devices 140 coupled to the network 102 for vulnerabilities 302, aggregating information about the network devices 140, comparing the aggregated information to known vulnerabilities, and determining the vulnerabilities based thereon, as discussed in further detail elsewhere herein. The method 300 may generate a risk report based on the vulnerabilities that are identified during the scanning 304, and automatically assign each of the vulnerabilities in the risk report to stakeholders 306.

The stakeholders may include an individual or a group of individuals responsible for fixing or remediating vulnerabilities within a network, including any individual or group of individuals involved in approving remediation proposals, adding data to the system, fixing vulnerabilities, or otherwise involved in managing, remediating risks, or helping others manage or remediate risks. In some embodiments, the vulnerabilities may automatically be assigned to the stakeholders based on the requirements to fix the vulnerabilities and the skills of the stakeholders. An example of this situation is if there is a vulnerability in a particular internet browser, the vulnerability may be assigned to a stakeholder who is listed as being knowledgeable about that internet browser. It should be understood that there could be any number of requirements, corresponding qualifications, or other criteria that may be used in assigning vulnerabilities to stakeholders.

In block 308, the method 300 receives remediation proposals from stakeholders for remediating the vulnerabilities. In some embodiments, the method 300 may receive a remediation proposal from a stakeholder of a first vulnerability for remediating the vulnerability. In some cases, the stakeholder may input the remediation proposal into a corresponding interface on a client device or terminal and submit the proposal to the VCA engine 110, which may receive and process it. In some instances, the remediation proposal may include suppression or exemption of the vulnerability. In some instances, a stakeholder may elect to immediately fix or begin working on fixing a particular vulnerability, which may not require a remediation proposal from the stakeholder.

In block 310, the method 300 may obtain approvals for the remediation proposals to remediate the vulnerabilities and may facilitate the remediation of the vulnerabilities based thereon in block 312. In some embodiments, the VCA engine 110 may obtain an approval for a remediation proposal to remediate a first vulnerability as proposed.

Figure 4:
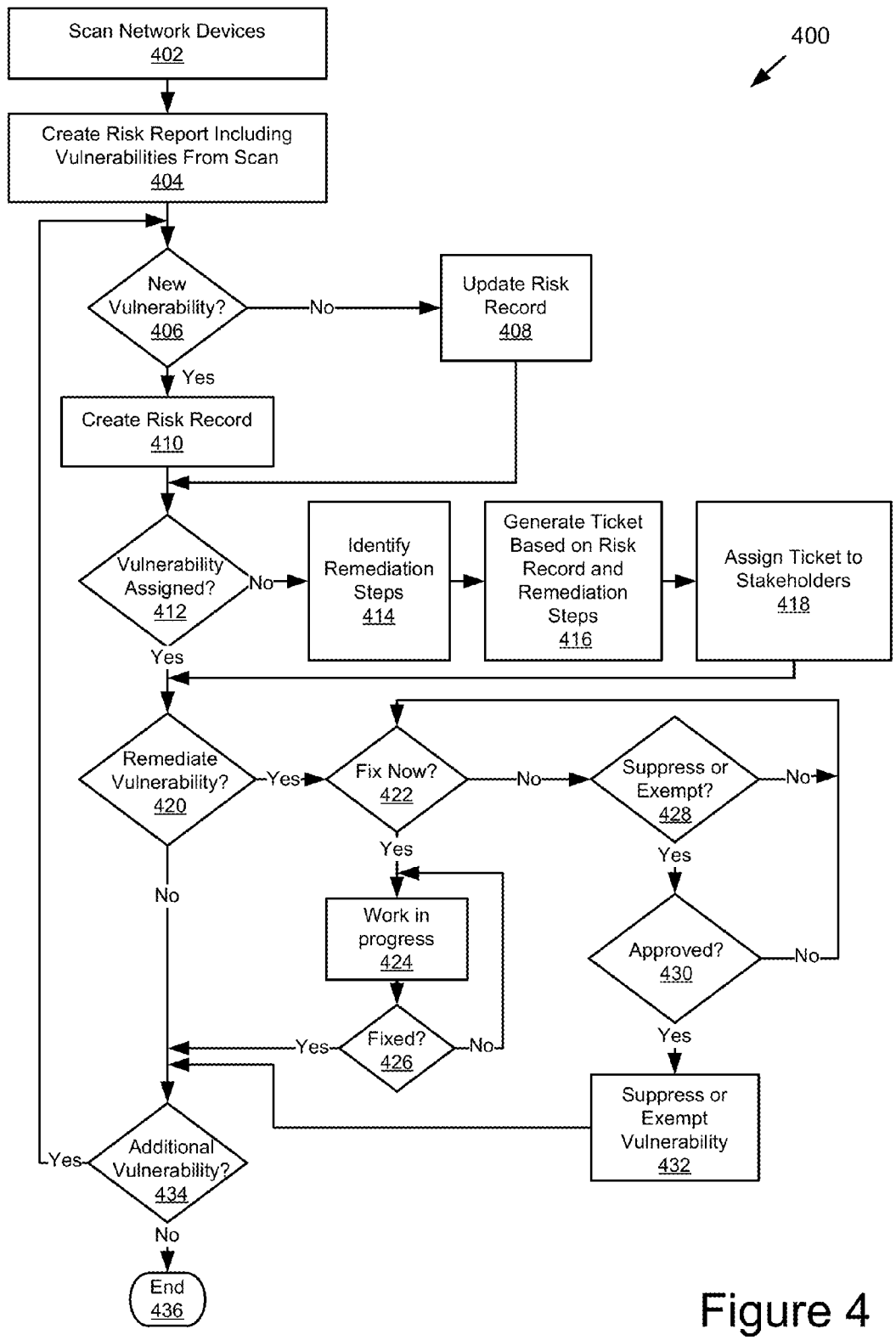
FIG. 4 depicts an example method for automatically creating and assigning vulnerabilities and obtaining approval of suppression or exemption proposals.

FIG. 4 depicts an example workflow 400 for automatically creating and assigning vulnerabilities and obtaining approval of suppression or exemption proposals. As depicted, the system may scan 402 the network devices and create a risk report including vulnerabilities from the scan 404. The operations in blocks 402 and 404 may be performed by the network scanner(s) 130 in some embodiments.

The method 400 may then process each of the vulnerabilities in the report. In particular, in block 406 the method 400 may determine if a vulnerability from the report is new. If not new, then the method 400 may update the risk record in block 408. If the vulnerability is new, the method 400 may create a new risk record.

Next, the method 400 may determine whether the vulnerability has been assigned to a stakeholder in block 412. If the system determines that the vulnerability has already been assigned, then the operations of assigning the vulnerability (414, 416, and 418) may be bypassed. If the vulnerability has not been assigned, the method 400 may identify one or more remediation operations for remediating the vulnerability as shown in block 414.

In some embodiments, remediation steps may have been previously entered manually or automatically (e.g., by a user via a corresponding interface and received by the VCA engine, automatically determined based on one or more remediation rules defined by an administrator, etc.) and may be associated with particular vulnerabilities. In some embodiments, the steps may include specific actions which could be provided directly to a stakeholder in a risk report or remediation ticket. In some embodiments, the steps may be provided to the stakeholder in such a way that the stakeholder could merely direct the computer to automatically remediate the vulnerability or a group of vulnerabilities.

By way of further example, the network scanner(s) 130 may scan the network and network devices to determine if any of the devices have an outdated service pack on their operating systems. Once the workflow 400 indicates that the vulnerability needs to be assigned, the VCA engine 110 (or another component of the system) could identify in the vulnerability database and/or the risk record the steps to update the service pack of the operating system on the one or more affected devices. The steps required to update the service pack may be provided to the stakeholder in the ticket. In some embodiments, the ticket includes a link allowing the stakeholder to automatically update the operating systems on the affected devices.

In block 416, the method 400 may generate a remediation ticket based on the remediation operations and/or risk record and, in block 418, may then assign each of the vulnerabilities/tickets to one or more corresponding stakeholders. In some embodiments, the assignment may be based on the risk record and/or the remediation steps. Example criteria for assigning a ticket is described above in reference to at least FIG. 3. By way of further example, a ticket, including a suggested operation of updating the operating system service pack, may be assigned to a stakeholder who is familiar with that particular operating system as well as the procedures and implications of updating the service pack.

The method 400 (e.g. performed by the VCA engine) may determine whether to remediate the vulnerability in block 420. In some embodiments, this may occur after the ticket has been assigned to a stakeholder or it has been determined that the ticket/vulnerability has already been assigned. If the vulnerability has already been remediated or does not require action then the method 400 proceeds to block 434. In some embodiments, the method 400 is capable not only of assigning a ticket to a stakeholder, but also of reassigning the ticket/vulnerability to a new stakeholder as necessary.

In block 420, if the method 400 determines that the vulnerability should be remediated, then the method 400 determines in block 422 whether to fix the vulnerability. If not, the method 400 determines in block 428 whether to suppress or exempt the vulnerability. In some embodiments, the decisions whether to fix the vulnerability or to suppress or exempt the vulnerability may be made by a stakeholder, automatically by the VCA engine 110 based on one or more criteria (e.g., a previously denied remediation proposal or a particular threat security level), etc.

If the method 400 determines to fix the vulnerability in block 422, the method 400 may proceed to block 424 where it enters a work-in-progress state 424 until the vulnerability is fixed 426, at which point the system determines at block 434 whether another vulnerability needs to be assigned and/or remediated. In some embodiments, the VCA engine 110 may receive a remediation proposal for a vulnerability indicating to fix the remediation and may determine to facilitate the remediation of the vulnerability based thereon.

If the decision made at block 422 is to not fix now, then the method 400 may proceed to block 428 where it determines whether to suppress or exempt the vulnerability. If it the decision is made to not suppress or exempt the vulnerability in block 428, then the method 400 proceeds back to block 422, throws an error, or ends. If the decision made at block 428 is to suppress or exempt the vulnerability, then the method 400 proceeds to determine approval for suppressing or exempting the vulnerability at block 430. The process for approving or rejecting the proposal is discussed in further detail in reference to at least FIG. 6. In the circumstance that the proposal to suppress or exempt is not approved, then the workflow may wait, may return to the decision at block 422, etc. If, in block 430, approval is provided, then the method 400 proceeds to suppress or exempt the vulnerability in block 432. The method 400 then proceeds to block 424 to determine whether there are an additional vulnerabilities to process. If there are no additional vulnerabilities to process from the risk report, the method 400 may end in block 436. If it is determined that there are additional vulnerabilities in the risk report to process then the method 400 may return to block 406 and continue processing from there.

Figure 5A:
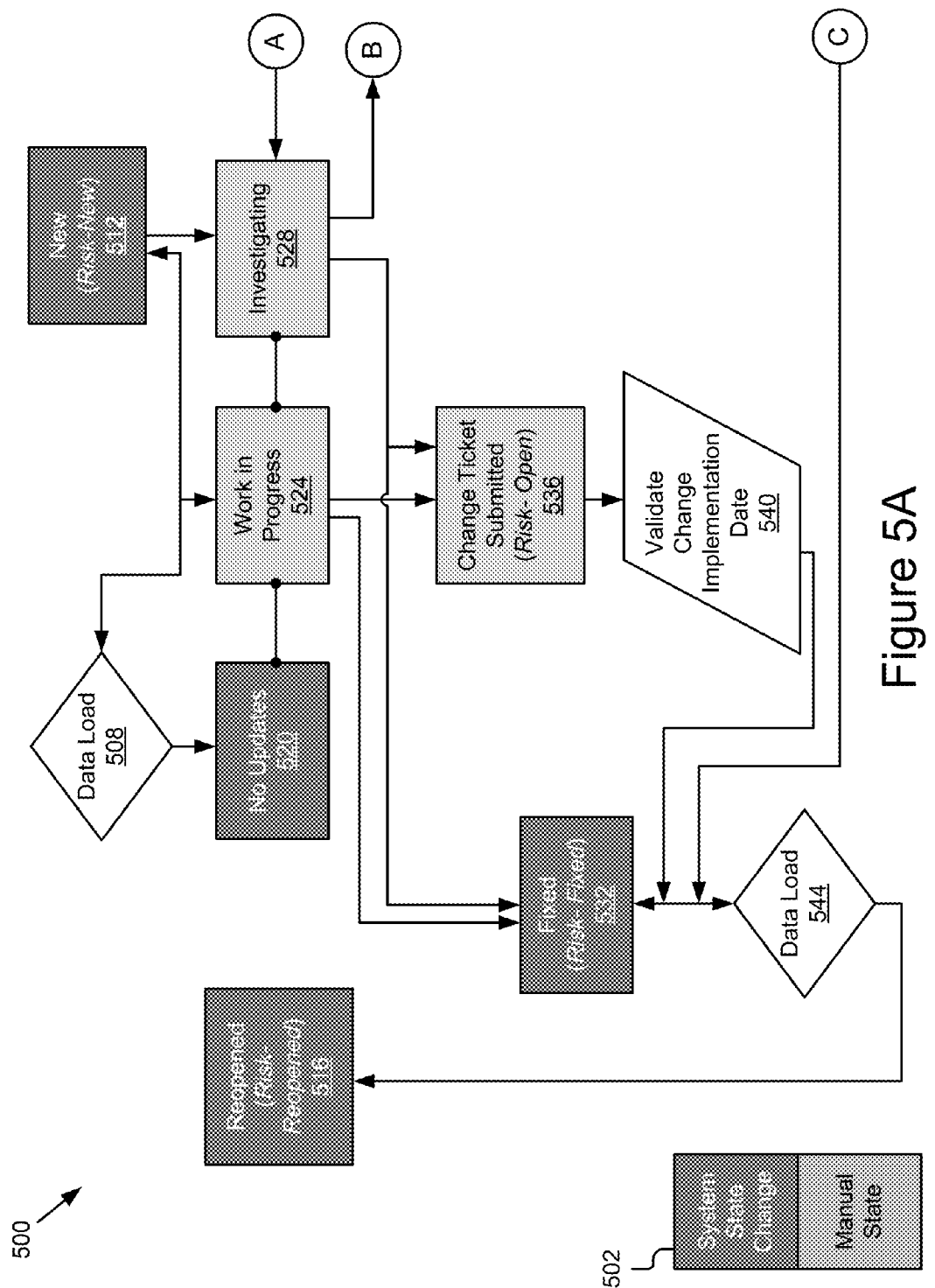
FIGS. 5A, 5B, and 5C depict an example automated remediation, suppression, and exception method.
Figure 5B:
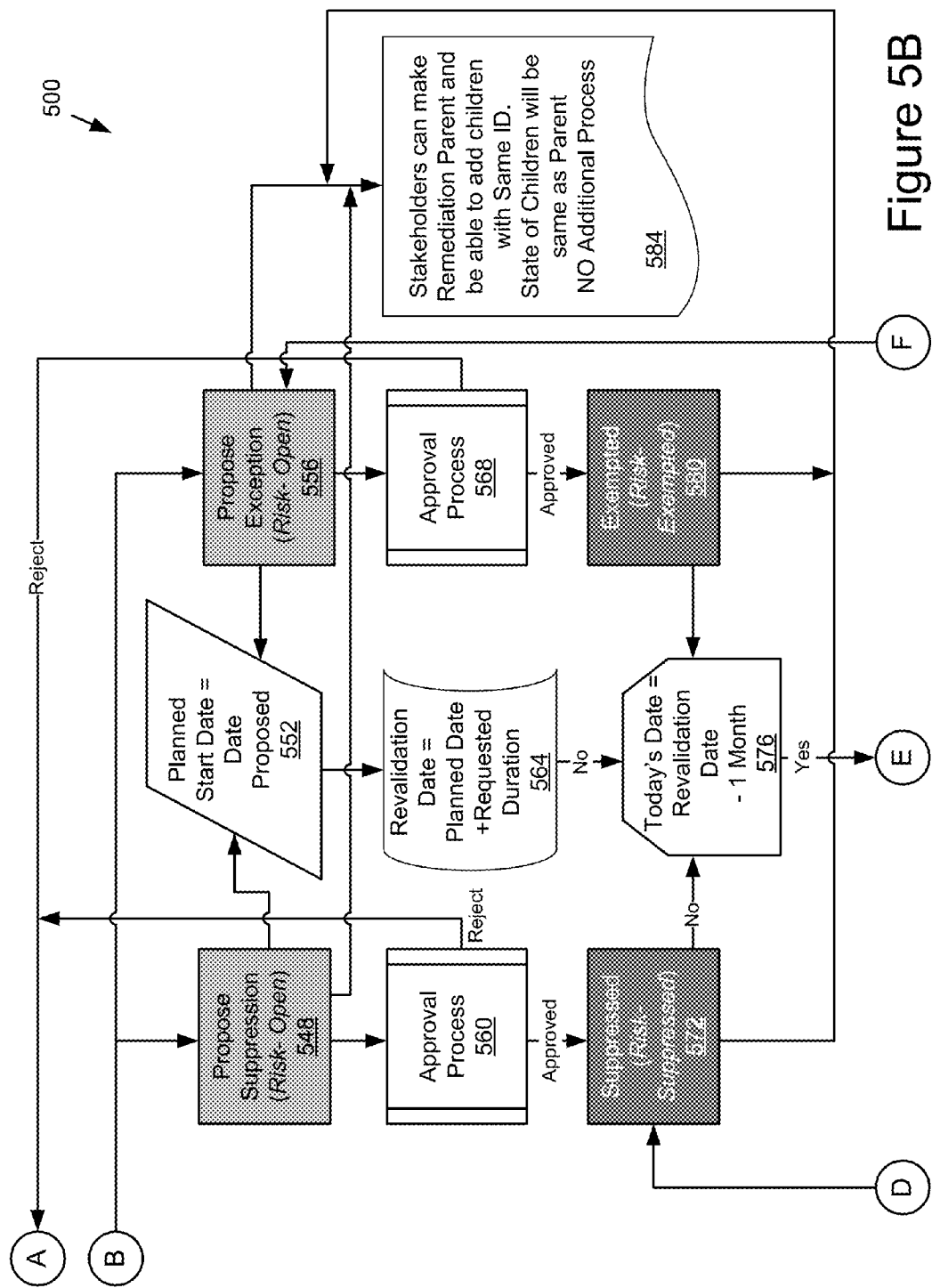
Figure 5C:
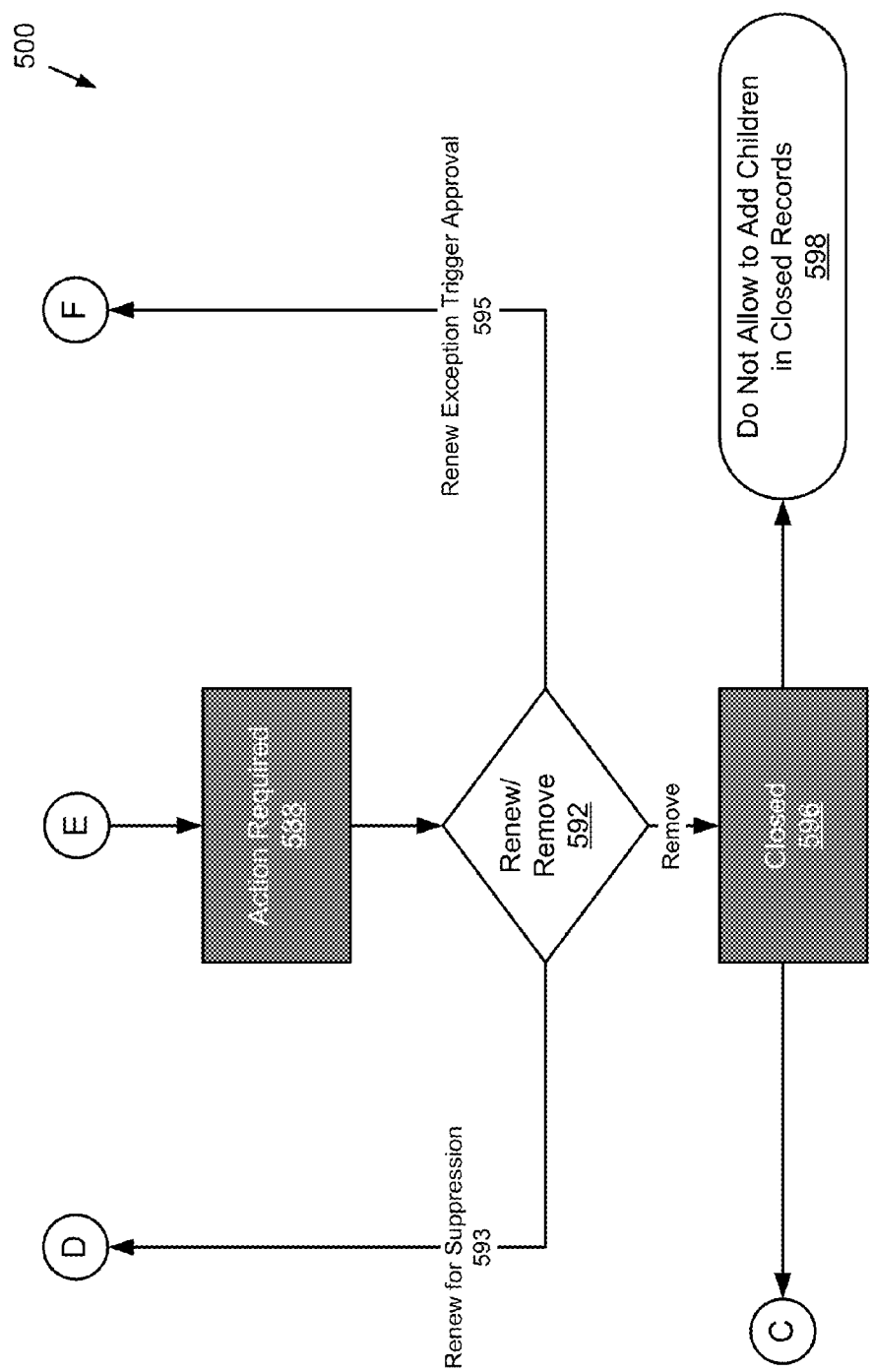

FIGS. 5A, 5B, and 5C (collectively referred to as FIG. 5) depict an example remediation, suppression and exception method 500 having various remediation states. In the figures, the remediation states are coded, as shown in the legend 502, to reflect whether they are manual state changes or system state changes, although other arrangements are possible where the manual state changes are reconfigured to be updated by the system and vice-versa. As depicted, the dark, filled blocks indicate system state changes and the light, filled blocks indicate manual state changes.

In block 508 and 544, the method 508 loads the vulnerability data (e.g., a risk report). This may be done periodically by the VCA engine 110 in order to update existing vulnerabilities or to add new vulnerabilities. In block 512, the method 500 for a given vulnerability, the method 500 may flag a vulnerability as new if it had not appeared in previous risks reports. In block 528, the method 500 may place the risk/vulnerability (used interchangeably) in an investigating state, during which an assigned stakeholder may investigate the risk. If at some point during the investigating state, it is determined that the risk should be fixed, the method 500 may place the risk into a work in progress state, and may proceed to block 536 where it receives a submitted change ticket and may flag it as open. Flagging a ticket (referred to as the risk in some cases) may include annotating the ticket with a status identifier that indicates its state. Next, the method 500 may validate the change implementation date in block 540, and then may proceed to blocks 532 and/or 544 as indicated.

By way of example, the network scanner(s) 130 find a network device 140 with an outdated operating system service pack, the VCA engine places the vulnerability in an investigating state while it is determined whether the vulnerability should be fixed at the current time. The VCA engine 110 may also place the risk into a work-in-progress state while the risk is being remediated. The VCA engine 110 can monitor the progress of the remediation to determine if there are updates on its progress. The VCA engine 110 may also update the ticket if there is updated information about the risk, such as if a new service pack is released while the risk is in a work-in-progress state.

Upon completion of the investigation in block 528, the method 500 may proceed to blocks 532, 548, and 556. In block 532, the method 500 may flag the risk as being fixed, whereupon it may be closed or, if new information about the vulnerability is learned via a subsequent data load operation 544, the risk may be reopened and the method 500 may repeat. In some embodiments, at any point, the method 500 may determine if the status of any risks have changed between data loads, and if so, may process the risks, and update the tickets accordingly. In some instances, changes in state in blocks 528, 524, 532, etc., may be based on information received by the VCA engine 110, such as inputs provided by stakeholders via a vulnerability management interface presented by their client devices.

In block 556, the method 500 proposes suppressing the risk and in block 556 the method 500 proposes excepting the risk. In these blocks the method 500 may update the state of the risk accordingly (e.g., by changing the remediation state changes to propose suppression or propose exception. From each of blocks 548 and 556, the method 500 may proceed to block 552 and set the planned start date (which is the date proposed) to the current date and then set the revalidation date by adding the planned start date and the requested duration in block 564. In some embodiments the duration may be predefined or input by a stakeholder in a corresponding user interface and provided to the VCA engine 110.

In some embodiments, responsive to proposing the suppression or exception in blocks 548 and 556, the method 500 may associate in block 584 current proposals with future corresponding proposals for reference and/or efficiency purposes (e.g., use an existing exception/suppression ticket for future reference). An example of this is if the same vulnerability is detected on a second network device, an existing exception/suppression ticket can be used to exempt/suppress the vulnerability on the second network device. In some embodiments, a stakeholder may also manually create a parent ticket which will allow future similar vulnerabilities (children) to be automatically remediated in the same way that the previous/parent vulnerability.

Next, the method 500 may proceed to obtain approval for the suppression or exception, as the case may be, by proceeding to block 560 or 568. In some embodiments, approval for a remediation proposal may be requested from an administrator of the stakeholder. In some embodiments, the VCA engine 110 may notify the administrator of the request by updating the ticket so the next time the administrator logs into a management interface presented on a client device of the administrator, the administrator is notified of the approval request. In some embodiments, the VCA engine 110 may send the administrator an electronic message (e.g., an email) notifying the administrator of the approval request and/or providing an electronic link that the administrator may conveniently select to redirect the administrator to an approval interface for reviewing the proposal, the nature of the risk and any nuances or special considerations (e.g., as indicated by a stakeholder), etc. The request may further ask the administrator to approve the remediation proposal to exempt or suppress, as the case may be, the vulnerability for a predetermined amount of time, and once the predetermined amount of time has expired, renew or remove the remediation proposal.

Figure 6:
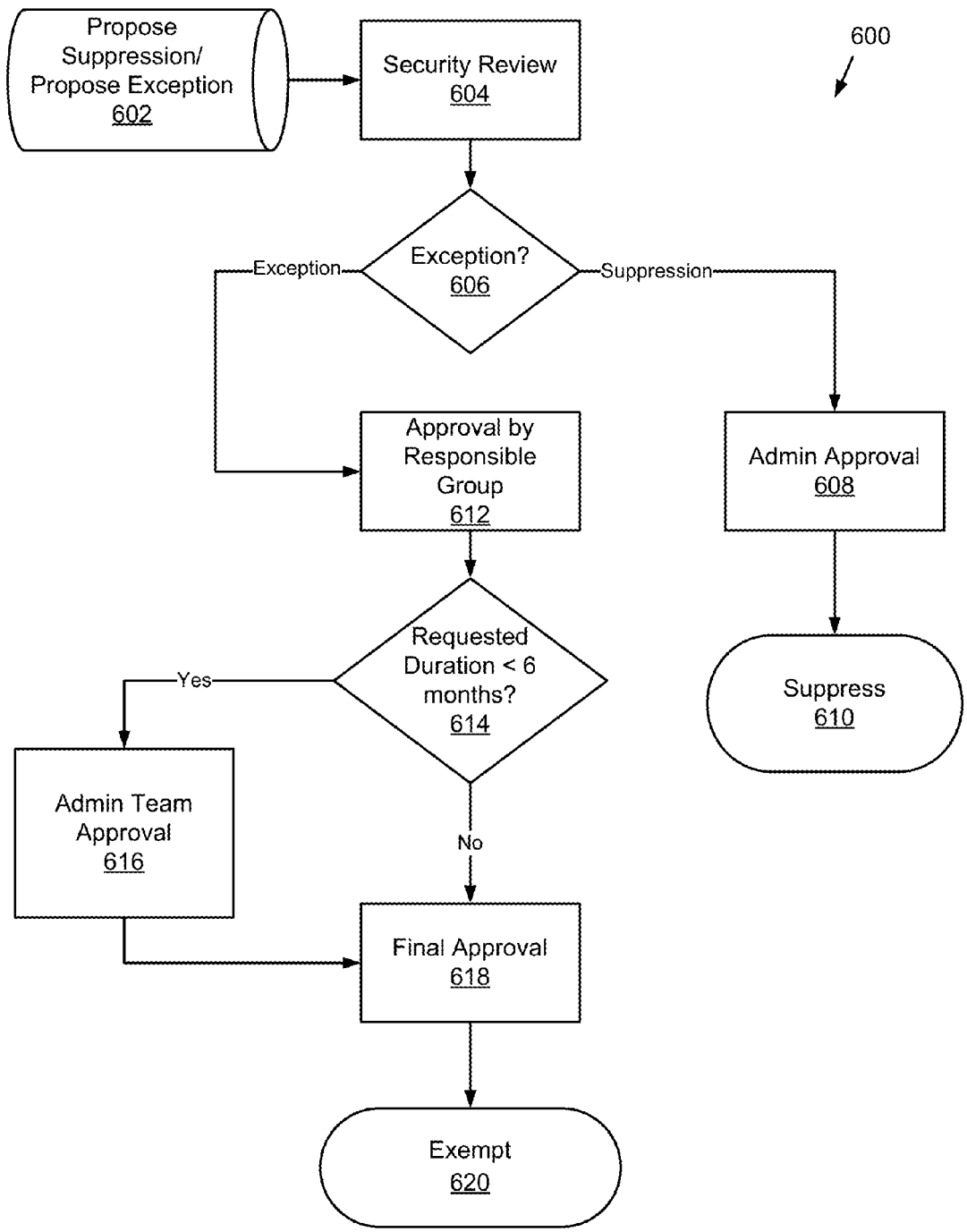
FIG. 6 depicts an example approval method for a suppression or exception.

An example approval process for blocks 560 and 568 is illustrated in FIG. 6. In block 602, the method 600 may propose to suppress or except the risk, as discussed further elsewhere herein, and may proceed to block 604, in which the method 600 provides a security review team with the remediation task for review 604. In some embodiments, the VCA engine 110 may assign the risk to the security review team and provide data describing the risk, the approval request, etc., to the client device(s) of the team for presentation. Using a corresponding interface presented on the client device(s) of the team (e.g., via a web browser), the team may view the remediation task, fill in any required details, and then approve or reject accordingly. Input provided by the team may then be transmitted to the VCA engine 110.

After the review in block 604, the method 600 determines in block 606 whether the proposal is for a suppression or exception, and depending on which it is, the method 600 may proceed to request approval from the appropriate administrator(s) in blocks 612 and 608, respectively. In block 608, the method 600 may request a corresponding administrator for approval to suppress the risk, and if approved the method may suppress the risk as requested (or may reject the proposal as discussed elsewhere herein) and/or close and/or the corresponding ticket. Alternatively, in block 612, the method 600 may request approval from a corresponding responsible group to except the risk. In some embodiments, the VCA engine 110 may identify the responsible group based on a unique ID that associates the group with the ticket. If the exception includes a duration of more than a predetermined amount of time (e.g., six months), the method 600 may determine in block 614 that the request requires heightened scrutiny and may proceed to block 616 and request approval from an administrative team. If not, the method may proceed to block 618 for final approval.

If approved by the administrative team in block 616, the method 600, in some cases, may request final approval by the responsible group (or another) in block 618. In block 618, responsive to receiving final approval, the method 600 may in block 620 except/exempt the risk for the duration requested, as discussed elsewhere herein, and/or close and/or suspend the corresponding ticket. For example, once the required approvals have been secured, the VCA engine 110 may place the task into an exempted state and may flag the ticket as closed in the database. In some embodiments, at any point in the method 600, if the ticket/task is rejected, the ticket may be placed back into the investigating state by the VCA engine 110.

In some embodiments, in blocks 608, 612, and/or 616, the VCA engine 110 may assign the approval task to the appropriate administrator or group security review team and provide data describing the risk, the approval request, etc., to the client device(s) of those individual(s) for presentation. Using a corresponding interface presented on the client device(s) of those individuals(s) (e.g., via a web browser), the individual(s) view the approval task, the fill in any required details, and then approve or reject accordingly. Input provided by the individual(s) may then be transmitted to the VCA engine 110.

Returning to FIG. 5B, upon receiving approval, the method 500 may proceed to suppress or exempt the risk in blocks 572 and 580, respectively, after which the method 500 may eventually proceed to block 588 and place the risk in an action required state. In some embodiments the action required state may be triggered once the exception/suppression has existed for long enough that it must be revalidated. In some embodiments, this may occur one month before the revalidation date. For instance, in block 576, if the current date equals the revalidation date minus one month, the method 500 may proceed to block 588, set the state accordingly, and notify the stakeholder(s) of the required action. Notification may be provided by the VCA engine 110, as discussed elsewhere herein. In block 592, if the method 500 determines whether to renew or remove the proposal. In some embodiments, responsive to receiving notification in block 588, the stakeholder(s) may provide input indicating whether to renew or remove the proposal, and the VCA engine 110 may proceed based thereon.

If the result in block 592 is to remove the exception or suppression, then the method 500 closes the remediation ticket in block 596. If the result in block 592 is to renew the proposal, then the method 500 may be placed back into the suppressed or exempted state by returning to the corresponding block 572 or 580 as reflected by reference numerals 593 and 595, respectively. In block 598, after the risk is closed, the method 600 may in some embodiments restrict related risks/corresponding children (e.g. new instances of the same vulnerability) from being added in closed tickets.

Figure 7:
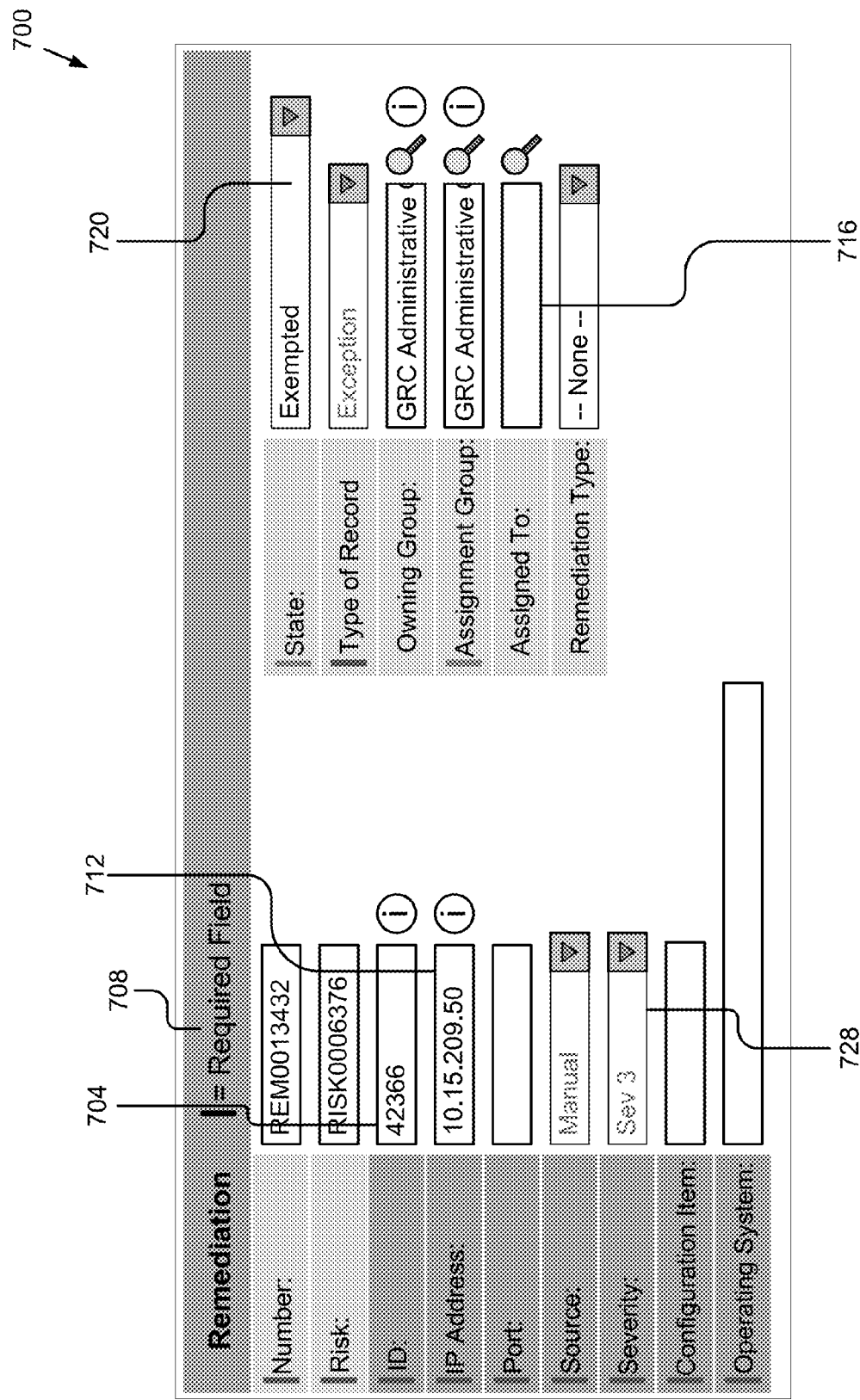
FIG. 7 depicts an example remediation ticket.

FIG. 7 depicts an example remediation ticket 700 that is automatically populated and/or created based on a risk record. The figure shows the ticket with example fields such as a vulnerability ID 704, the IP address of a particular network device 712, and the severity level 728 for the particular vulnerability. FIG. 7 also shows example fields of the state of the particular vulnerability 720. As shown the state may be exempted, but may also indicate any other applicable remediation state. FIG. 7 also shows an example data field indicating whether and to which stakeholder the vulnerability/ticket has been assigned. Each of the fields in the ticket 700 may be automatically filled using systems, methods, and information described herein. FIG. 7 also indicates the possibility that the ticket may be fully or partially created and filled out by a stakeholder as necessary.

The ticket 700 may allow tracking of a vulnerability through its life cycle in a single screen view, which would help track remediation activities for audit/compliance purposes. In some embodiments, the assigned stakeholder will only be able to see those tickets/vulnerabilities that are assigned to the stakeholder in order to prevent sensitive vulnerability information from being seen by too many individuals, especially by those not responsible for that particular vulnerability/ticket.

Figure 8:
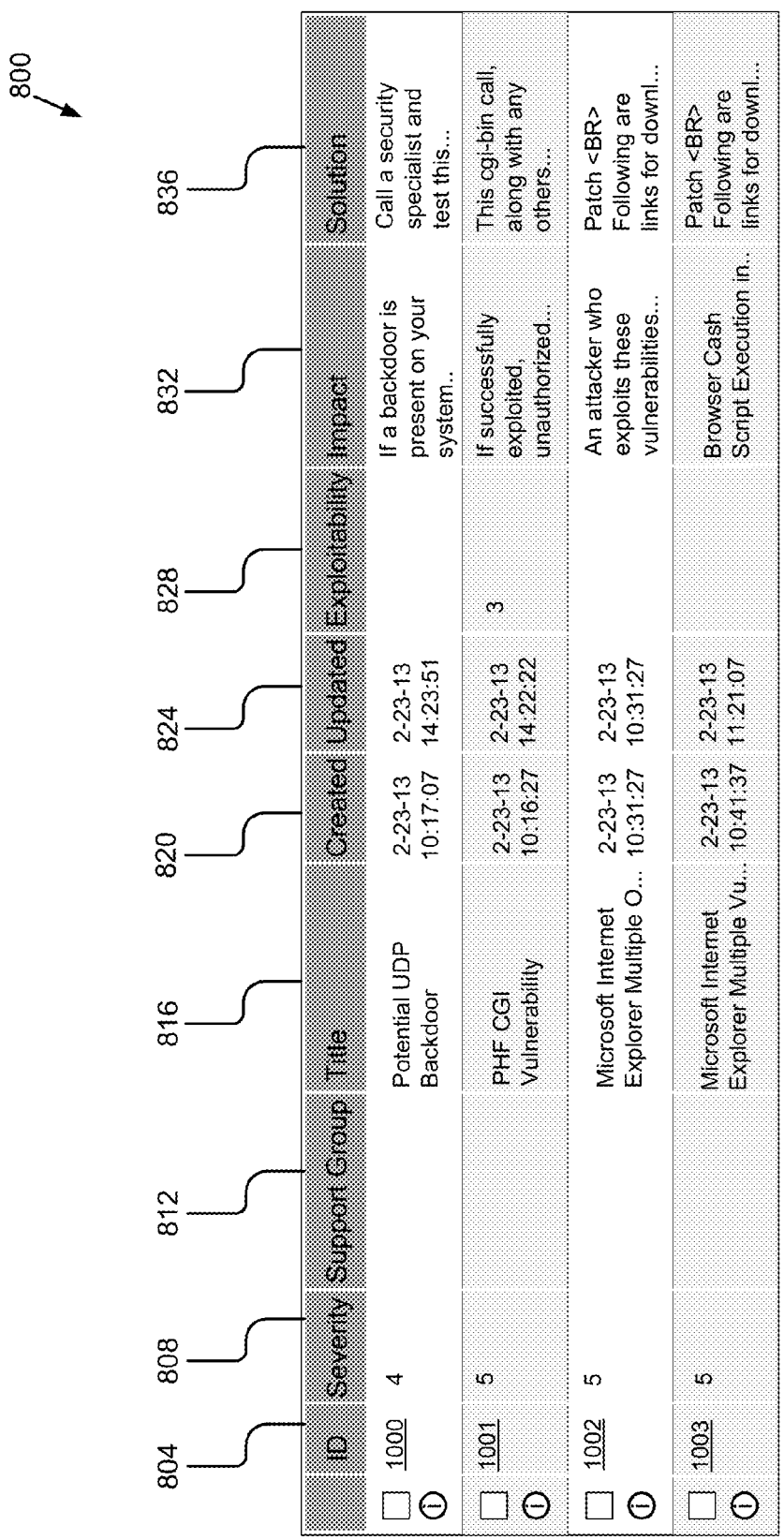
FIG. 8 depicts an example integrated knowledgebase.

FIG. 8 depicts an example integrated knowledgebase 800. The knowledgebase may have many different data fields, some of which are shown by way of example in the figure. The figure shows example fields indicating the ID 804 of various vulnerabilities, severity level 808, assigned support group 812, title of a vulnerability 816, date the record was created 820, date the record was updated 824, level of exploitability 828 of the vulnerability, potential impact 832, and recommended solution 836 to fix the vulnerability. It should be understood that the fields shown are by way of illustration and are not limited to the fields shown.

Figure 9:
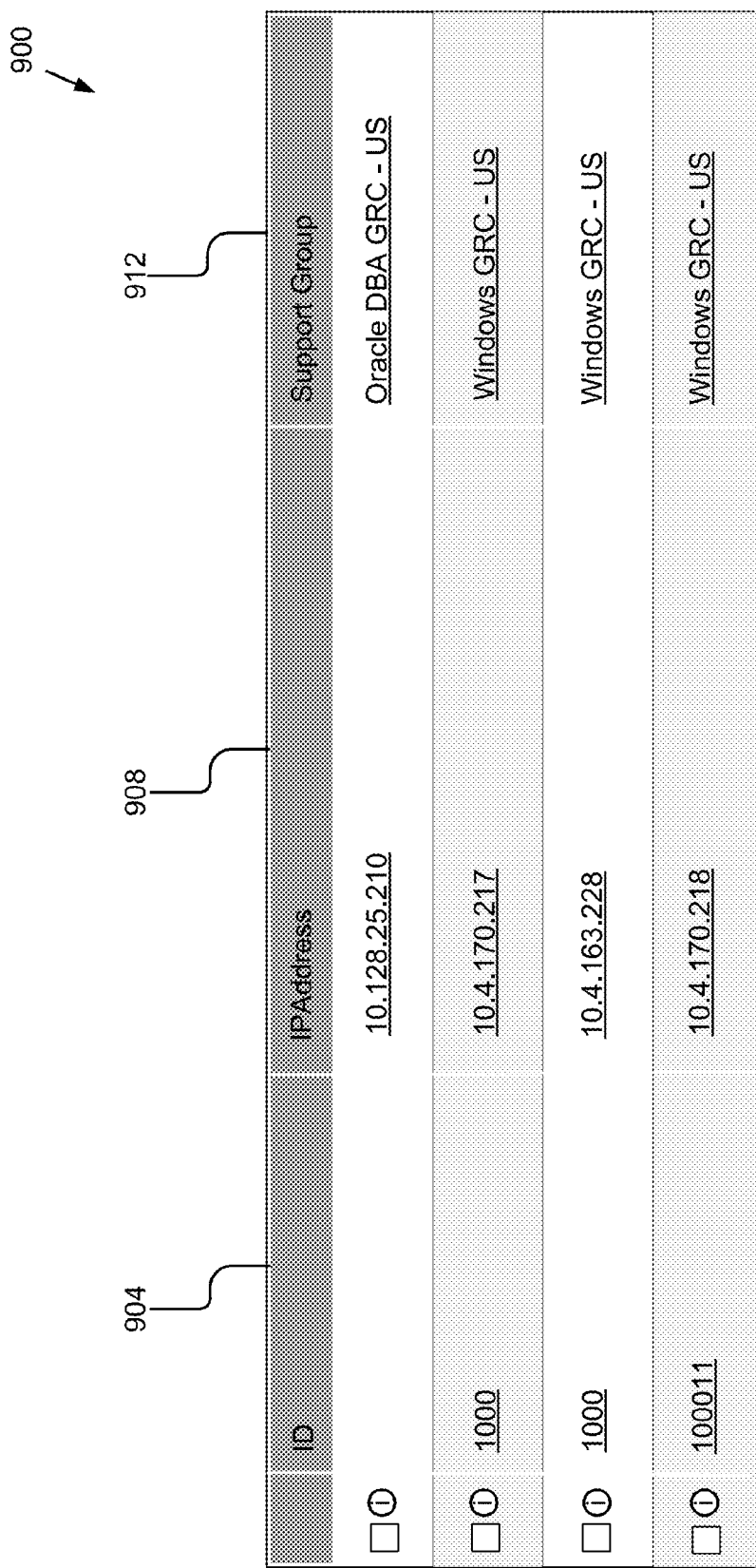
FIG. 9 depicts example assignments of risk tickets to appropriate groups for remediation.

FIG. 9 depicts example assignments 900 of risk tickets to appropriate groups for remediation. The assignments 900 may include data fields indicating, by way of example, the ID numbers 904 of particular vulnerabilities, IP addresses 908 for the affected network devices, and stakeholders assigned 912 to remediate the vulnerabilities.

Figure 10:
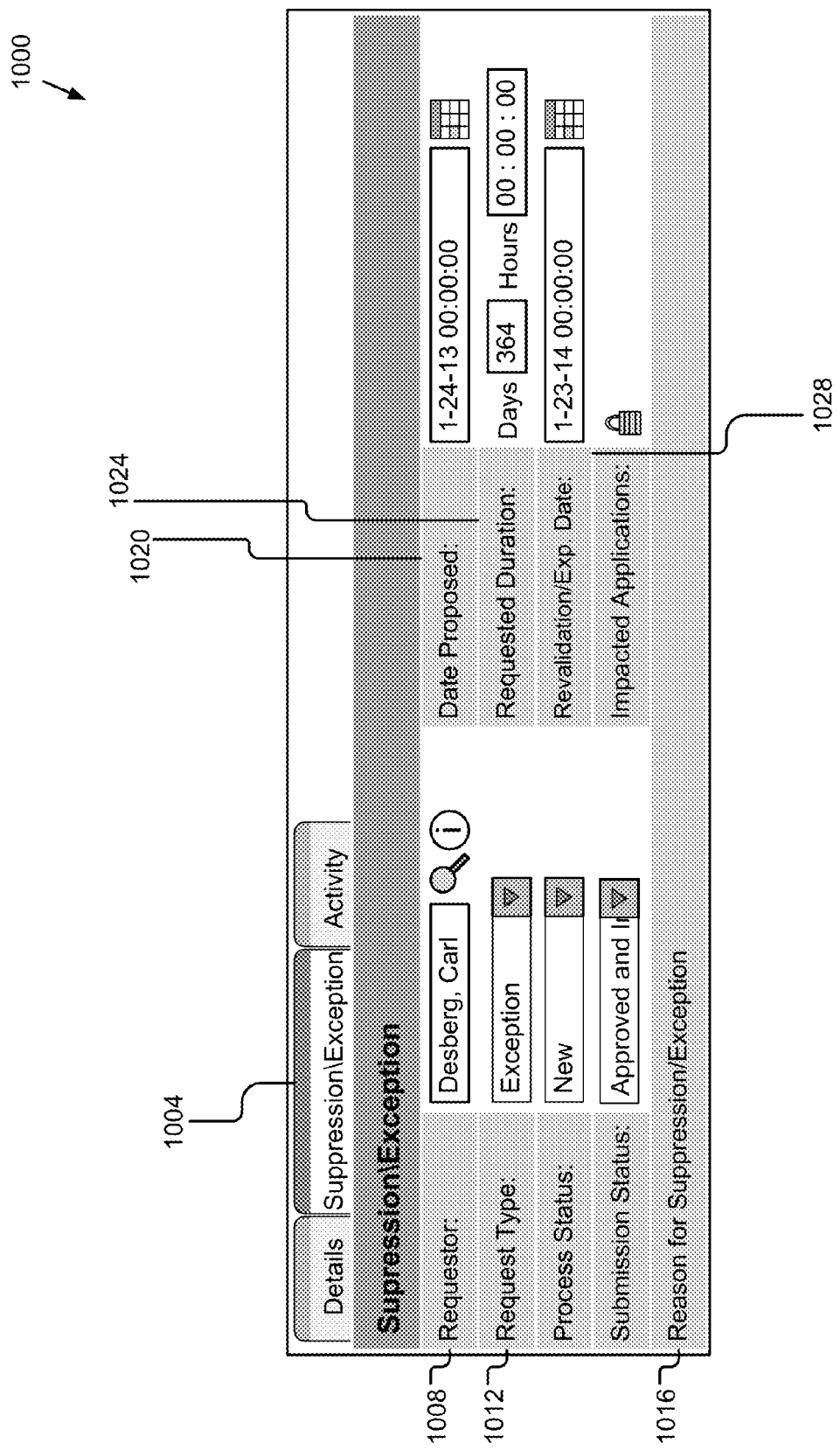
FIG. 10 depicts an example form for inputting a suppression/exception request.

FIG. 10 depicts an example form 1000 for inputting a suppression/exception request. This form, or one like it, may be used by a stakeholder to propose a suppression or exception. FIG. 10 shows multiple tabs at the top of the page, from which suppression\exception 1004 can be selected in order to allow the stakeholder to enter information regarding the suppression/exception proposal. The form may also include fields for identification of the requestor 1008, whether the request is for suppression or for exception 1012, and reasons for the remediation proposal 1016. In some embodiments, the form 1000 may also include fields for the date that the remediation was proposed 1020, the requested duration 1024 of the suppression/exception, and the revalidation/expiration date 1028 of the suppression/exception. The fields indicated as being present on the form 1000 in FIG. 10 are presented by way of example and are not limiting, and it should be understood that other fields are possible and contemplated.

In some embodiments, there may further be a dedicated reporting dashboard (not shown) for remediation teams, vulnerability administrators, and other stakeholders to report information about vulnerabilities and remediation efforts. This dashboard may be a computer program that accumulates information, such as progress of fixing vulnerabilities, progress of approving remediation proposals, progress of compliance with policies. The reporting dashboard may allow administrators to track vulnerability information aggregated from the system and/or from other stakeholders. A dedicated reporting dashboard as such would be particularly beneficial to an organization where a network has many network devices, many potential and actual vulnerabilities, and many stakeholders assigned to remediate those vulnerabilities.

In the above description, for purposes of explanation, numerous specific details are set forth in order to provide a thorough understanding of this disclosure. It should be understood, however, that the systems, methods, and computer products described herein can be practiced without these specific details. In other instances, structures and devices are shown in block diagram form in order to avoid obscuring the disclosure. For example, the various components, operations, and/or features are described in some implementations above with reference to user interfaces and particular hardware. However, the present disclosure applies to any type of computing device that can receive data and commands, and any peripheral devices providing services.

Reference in the disclosure to "one implementation," "an implementation," "some implementations," etc., (implementation and embodiment are used interchangeably) means that a particular feature, structure, or characteristic described in connection with the implementation is included in at least one implementation. The appearances of the phrase "in one implementation" or "in some implementations" in various places in the disclosure are not necessarily all referring to the same implementation(s).

Some portions of the detailed descriptions above are presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms including, for example, "processing" or "computing" or "calculating" or "defining" or "identifying" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, for example, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In a preferred implementation, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It will be appreciated that a variety of programming languages may be used to implement the teachings of the disclosure as described herein.

The foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the present disclosure is in no way limited to implementation in any specific programming language, or for any specific operating system or environment.

What is claimed is:

1. A computer-implemented method comprising:
   determining vulnerability data describing vulnerabilities of an information technology environment by scanning a plurality of computing devices coupled to a network for the vulnerabilities using a plurality of network scanners;
   generating, using one or more hardware processors, risk tickets using the vulnerability data, each risk ticket including one or more remediation operations for remediating one or more of the vulnerabilities;
   assigning, in a data store using the one or more hardware processors, each risk ticket to a corresponding stakeholder identifier associated with a stakeholder based on an association of one or more predetermined skills of the stakeholder with the one or more remediation operations for remediating the one or more of the vulnerabilities of the risk ticket;

receiving, using the one or more hardware processors, a remediation proposal from the stakeholder of a first vulnerability for remediating the first vulnerability; and obtaining, using the one or more hardware processors, an approval for the remediation proposal to remediate the first vulnerability as proposed.

2. The computer-implemented method of claim 1, further comprising:

determining one or more future vulnerabilities to be similar to the first vulnerability;

associating, based on the risk ticket, the remediation proposal with the one or more future vulnerabilities based on the similarity of the one or more future vulnerabilities to the first vulnerability; and facilitating remediation of the one or more future vulnerabilities based on the associated remediation proposal.

3. The computer implemented method of claim 1, further comprising:

determining a second vulnerability included in the vulnerability data to be a new vulnerability;

identifying one or more remediation steps for remediating the second vulnerability; and generating a remediation ticket based on the one or more remediation steps, wherein assigning of each of the vulnerabilities includes assigning the second vulnerability to a corresponding stakeholder.

4. The computer-implemented method of claim 1, further comprising:

receiving a remediation proposal for a second vulnerability, the remediation proposal indicating to fix the second vulnerability; and facilitating the remediation of the second vulnerability.

5. The computer-implemented method of claim 1, wherein the remediation proposal indicates to suppress the first vulnerability and obtaining the approval for the remediation proposal includes requesting administrative approval from an administrator of the stakeholder.

6. The computer-implemented method of claim 1, wherein the remediation proposal indicates to except the first vulnerability and obtaining the approval for the remediation proposal includes requesting administrative approval from an administrator of the stakeholder.

7. The computer-implemented method of claim 1, wherein obtaining the approval includes:

receiving approval from an administrator approving the remediation proposal;

exempting or suppressing the first vulnerability for a predetermined amount of time; and once the predetermined amount of time has expired, renew or remove the remediation proposal.

8. The computer implemented method of claim 1, wherein the vulnerabilities include one or more of backdoors, overflow vulnerabilities, obsolete software, out of date software, software bugs, spyware, default or weak passwords, insecure network architecture, and hardware vulnerabilities.

9. A computer program product comprising a non-transitory computer-usable medium including instructions which, when executed by a computer, cause the computer to:

determine vulnerability data describing vulnerabilities of an information technology environment by scanning a plurality of computing devices coupled to a network for the vulnerabilities using a plurality of network scanners;

generate risk tickets using the vulnerability data, each risk ticket including one or more remediation operations for remediating one or more of the vulnerabilities;

assign in a data store each risk ticket to a corresponding stakeholder identifier associated with a stakeholder based on an association of one or more predetermined skills of the stakeholder with the one or more remediation operations for remediating the one or more of the vulnerabilities of the risk ticket;

receive a remediation proposal from the stakeholder of a first vulnerability for remediating the first vulnerability; and obtain an approval for the remediation proposal to remediate the first vulnerability as proposed.

10. The computer program product of claim 9, further including instructions which, when executed by a computer, cause the computer to:

determine one or more future vulnerabilities to be similar to the first vulnerability;

associate, based on the risk ticket, the remediation proposal with the one or more future vulnerabilities based on the similarity of the one or more future vulnerabilities to the first vulnerability; and facilitate remediation of the one or more future vulnerabilities based on the associated remediation proposal.

11. The computer program product of claim 9, wherein the instructions further cause the computer to:

determine a second vulnerability included in the vulnerability data to be a new vulnerability;

identify one or more remediation steps for remediating the second vulnerability; and generate a remediation ticket based on the one or more remediation steps, wherein assigning of each of the vulnerabilities includes assigning the second vulnerability to a corresponding stakeholder.

12. The computer program product of claim 9, wherein the instructions further cause the computer to:

receive a remediation proposal for a second vulnerability, the remediation proposal indicating to fix the second vulnerability; and facilitate the remediation of the second vulnerability.

13. The computer program product of claim 9, wherein the remediation proposal indicates to suppress the first vulnerability and to obtain the approval for the remediation proposal includes requesting administrative approval from an administrator of the stakeholder.

14. The computer program product of claim 9, wherein the remediation proposal indicates to except the first vulnerability and to obtain the approval for the remediation proposal includes requesting administrative approval from an administrator of the stakeholder.

15. The computer program product of claim 9, wherein to obtain the approval includes:

receiving approval from an administrator approving the remediation proposal;

exempting or suppressing the first vulnerability for a predetermined amount of time; and once the predetermined amount of time has expired, renew or remove the remediation proposal.

16. The computer program product of claim 9, wherein the vulnerabilities include one or more of backdoors, overflow vulnerabilities, obsolete software, out of date software, software bugs, spyware, default or weak passwords, insecure network architecture, and hardware vulnerabilities.

17. A system comprising:
one or more hardware processors; and
one or more memories storing instructions that, when executed by the one or more processors, cause the system to:
   determine vulnerability data describing vulnerabilities of an information technology environment by scanning a plurality of computing devices coupled to a network for the vulnerabilities using a plurality of network scanners;
   generate risk tickets using the vulnerability data, each risk ticket including one or more remediation operations for remediating one or more of the vulnerabilities;
   assign, in a data store, each risk ticket to a corresponding stakeholder identifier associated with a stakeholder based on an association of one or more predetermined skills of the stakeholder with the one or more remediation operations for remediating the one or more of the vulnerabilities of the risk ticket;
   receive a remediation proposal from the stakeholder of a first vulnerability for remediating the first vulnerability; and
   obtain an approval for the remediation proposal to remediate the first vulnerability as proposed.

18. The system of claim 17, further comprising instructions that, when executed by the one or more processors, cause the system to:
   determine one or more future vulnerabilities to be similar to the first vulnerability;
   associate, based on the risk ticket, the remediation proposal with the one or more future vulnerabilities based on the similarity of the one or more future vulnerabilities to the first vulnerability; and
   facilitate remediation of the one or more future vulnerabilities based on the associated remediation proposal.

19. The system of claim 17, wherein the instructions, when executed by the one or more processors, further cause the system to:
   determine a second vulnerability included in the vulnerability data to be a new vulnerability;
   identify one or more remediation steps for remediating the second vulnerability; and
   generate a remediation ticket based on the one or more remediation steps, wherein assigning of each of the vulnerabilities includes assigning the second vulnerability to a corresponding stakeholder.

20. The system of claim 17, wherein the instructions, when executed by the one or more processors, further cause the system to:
   receive a remediation proposal for a second vulnerability, the remediation proposal indicating to fix the second vulnerability; and
   facilitate the remediation of the second vulnerability.

21. The system of claim 17, wherein the remediation proposal indicates to suppress the first vulnerability and to obtain the approval for the remediation proposal includes requesting administrative approval from an administrator of the stakeholder.

22. The system of claim 17, wherein the remediation proposal indicates to except the first vulnerability and to obtain the approval for the remediation proposal includes requesting administrative approval from an administrator of the stakeholder.

23. The system of claim 17, wherein to obtain the approval includes:
   receiving approval from an administrator approving the remediation proposal;
   exempting or suppressing the first vulnerability for a predetermined amount of time; and
   once the predetermined amount of time has expired, renewing or removing the remediation proposal.

24. The system of claim 17, wherein the vulnerabilities include one or more of backdoors, overflow vulnerabilities, obsolete software, out of date software, software bugs, spyware, default or weak passwords, insecure network architecture, and hardware vulnerabilities.

* * * * *